United States Patent
Milanesi

(10) Patent No.: US 8,714,391 B2
(45) Date of Patent: May 6, 2014

(54) SYSTEM OF OPENING AND CLOSURE WITH LEVER SERVOMECHANISM FOR PRESSURE COOKER

(75) Inventor: Fausto Milanesi, Verbania (IT)

(73) Assignee: Lagostina SpA, Verbania (IT)

(*) Notice: Subject to any disclaimer, the term of this patent is extended or adjusted under 35 U.S.C. 154(b) by 1703 days.

(21) Appl. No.: 11/719,752

(22) PCT Filed: Sep. 14, 2005

(86) PCT No.: PCT/EP2005/009862
§ 371 (c)(1),
(2), (4) Date: May 19, 2007

(87) PCT Pub. No.: WO2006/056253
PCT Pub. Date: Jun. 1, 2006

(65) Prior Publication Data
US 2009/0026200 A1    Jan. 29, 2009

(30) Foreign Application Priority Data
Nov. 23, 2004   (IT) .............................. MI2004A2268

(51) Int. Cl.
*B65D 51/16* (2006.01)

(52) U.S. Cl.
USPC .................................................... 220/203.03

(58) Field of Classification Search
USPC ......... 220/318, 316, 839, 849, 314, 912, 755, 220/752, 243, 241, 233, 576, 203.09, 220/203.29, 315; 292/217, 216, 240; 222/465.1, 472
See application file for complete search history.

(56) References Cited

U.S. PATENT DOCUMENTS 2,748,997 A * 6/1956 Richmond, Sr. .............. 222/469
4,132,327 A * 1/1979 Van Dyke et al. ............ 220/244

* cited by examiner

Primary Examiner — Steven A. Reynolds
Assistant Examiner — King M Chu
(74) Attorney, Agent, or Firm — John Alumit

(57) ABSTRACT

A system of opening and closure with lever servomechanism for pressure cooker of the type comprising a lever handle (1), a flexible lid (2) and an arc-shaped cross member (3) with the curved surface or back turned towards the handle, characterized in that said system comprises a fork (4) connected to the lever handle with a first hinge (8) and to the flexible lid with a second hinge (9), and a third hinge (7) for connection between said handle and the cross member (3), so as to reduce the force to be applied to the lever handle (1).

7 Claims, 3 Drawing Sheets

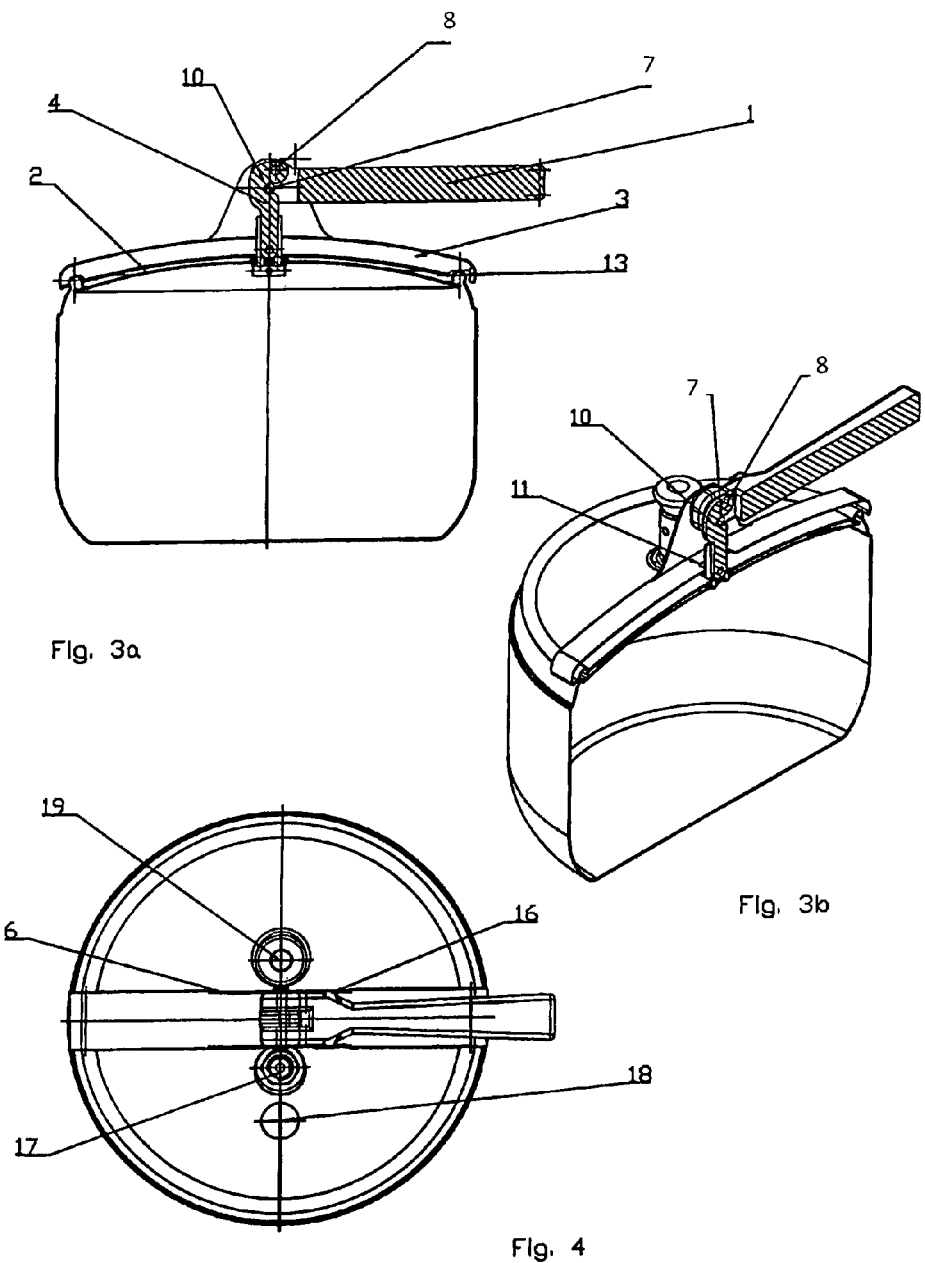

SYSTEM OF OPENING AND CLOSURE WITH LEVER SERVOMECHANISM FOR PRESSURE COOKER

BACKGROUND

The present invention relates to pressure cookers, more particularly, cookers for the cooking of food or for sterilisation purposes, of the type comprising a pressure receptacle for cooking and a flexible lid suitable for closing the receptacle from the inside, and pressing against a circular seat formed inside the upper edge of the same receptacle.

Pressure cookers currently in use are differentiated one from the other through the closure system adopted. The most widespread are those provided with a "bayonet" closure system, of the type described, for example, in French patent FR 2392639. There, the edges of the lid and of the receptacle for cooking are provided with radial fins, angularly distanced and suitable for engaging and disengaging reciprocally by means of rotating the lid in relation to the receptacle, through a predetermined angle, around the central axis of the cooker. There are also cookers provided with a "jaws" closure system, wherein the lid is provided with a pair of jaws which can move radially from a first position of closure to a second position of opening. In the first position of closure, the pair of jaws bring together and tighten the edges of the receptacle, which are outwardly bending and suitable for the purpose of tightening. In the second position of opening, the jaws move away, disengaging the edges of the receptacle and allowing removal of the lid. In contrast, the Applicant_distinguishes itself in the field of pressure cookers by its closure system with a "lever handle". In practice, the system is formed by a flexible lid which is inserted inside the pressure receptacle, by a cross member which is positioned outside the edge of the receptacle and by a lever provided at one end with a cam and pivoted above the cross member on a support connected to the lid. Once the lid is inserted in the receptacle, the cross member is rested on the edges of the receptacle and the lever is rotated. During rotation, the cam pushes on the cross member, causing the lid to raise, which abuts against the edge of the receptacle, which is inward bending and suitable for the purpose of opening. The lid is tightened in the close position by ending the rotation of the lever in a horizontal position opposite the starting position.

These systems of opening and closure all represent valid alternative solutions. The relative advantages depends mostly on the comparison between single specific embodiments and the taste and convenience of the purchaser, more than on the inherent features of the type of closure system in an abstract sense. The system with a "lever handle", which characterises part of the range of pressure cookers of the Applicant, has a series of special features which have gained consensus from part of the consumers, and which in coming years could promote diffusion on new markets. This system, in fact, is absolutely the simplest and the most economical, comprising few components which interact one with the other directly and rationally. Despite the fact that the lid is provided with release valves and with other safety elements present in every type of pressure cooker, it is inserted in the cooker and abuts the recessed edge of the pressure receptacle, totally preventing the possibility of structural breakage caused by removal of the lid from the cooker. This system also does not foresee any preferential positioning of the lid in relation to the receptacle in order to be able to perform the operation of closure. The movement of the lever handle is very intuitive and does not require special effort. However, some people, such as the elderly or those with certain disabilities, could encounter difficulty in opening and closing the pressure cooker. This difficulty may increase if regular maintenance is not carried out and fat vapours, which occur in pressure cookers, deposit in the interstitial areas of the components and harden the movement mechanisms.

The object of the present invention is therefore that of providing a system of opening and closure with a lever servomechanism for a pressure cooker, which maintains all practical and functional features of a pressure cooker at low cost, and which increases the convenience thereof thanks to a gentler and more fluid actuation of the closure lever, such as to make the loading and unloading of the pressure cooker simple and effortless, even for weak individuals.

A further object of the present invention is that of providing a system of opening and closure with a lever servomechanism, suitable for equipping various lines of pressure cookers for a demanding and modern clientele, attentive to the quality of the materials and manufacture, while providing an easy-to-use and low cost system.

The object of the invention is likewise that of providing a system of opening and closure with a lever servomechanism for making pressure cookers safe and reliable due to the fact that the lever abuts the lid on the edge of the container on the inside, thus preventing the lid from blowing off in the event the lever or locking button malfunctions or breaks.

Last but not least, an object of the present invention is that of providing a system of opening and closure with a lever servomechanism wherein the cam of the lever does not press directly on the plane of the cross member placed in a bridge fashion to counter-abut on the edge of the container, so as to allow a considerable reduction in the thickness of this cross member and hence a reduction in the costs associated with the production of the system of closure.

SUMMARY

A system of opening and closure with a lever servomechanism for pressure cooker of the type comprising a lever handle, a flexible lid and a cross member normally with an arc shape and with the curved surface or back turned towards the handle, characterised in that said system comprises a fork connected to the lever handle with a first hinge and to the flexible lid with a second hinge, and a third hinge for connection between said handle and the cross member, in such a way as to reduce the force to be applied to the lever handle.

The cross member will preferably be provided with at least one pair of brackets, positioned symmetrically at the sides of said cross member in a central position and rigidly restrained thereto in a known manner, whereto the lever handle is connected by means of said third hinge.

The first hinge and the third hinge will be positioned substantially on the same vertical line, in such a way that said first hinge is below said third hinge in the open handle position, while in the closed handle position said first hinge is above said third hinge.

These and other aspects will be made clearer with the aid of the following description of a preferred embodiment of the invention, to be read by way of a non-limiting example of the more general principle claimed.

DRAWINGS

The description refers to the accompanying drawings, in which:

FIGS. 3a, 3b show, in a plane and perspective view respectively, a side sectioned view of the cooker of FIG. 1 in closed position;

FIG. 4 shows a plane view from above of the cooker of FIG. 1.

DETAILED DESCRIPTION

Figure 1:
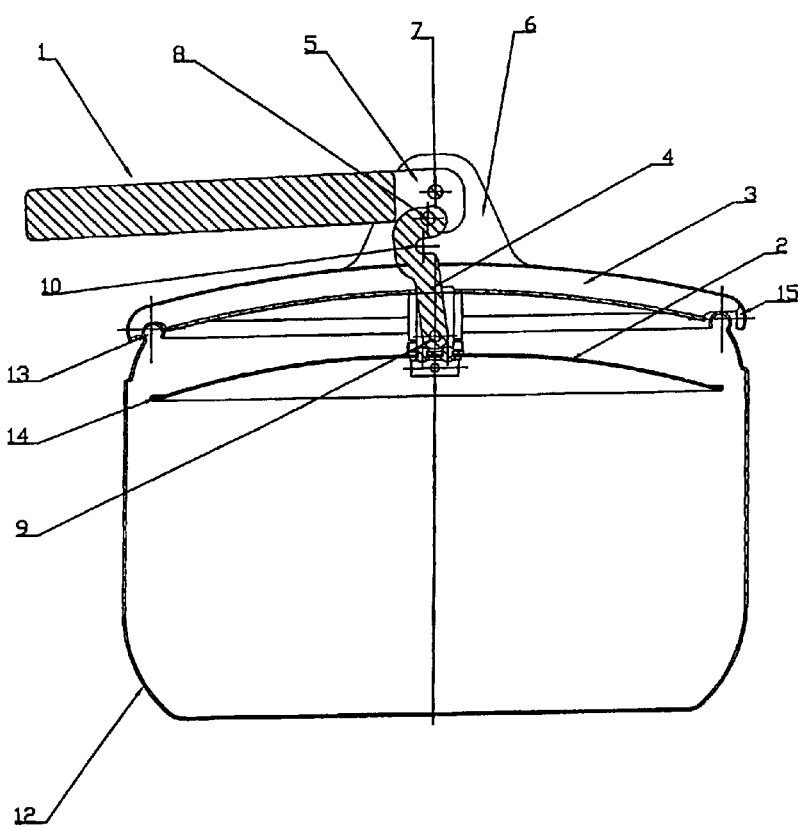
FIG. 1 shows a side sectioned view of the pressure cooker equipped with the opening and closure system according to the present invention, in the opening position.
Figure 2A:
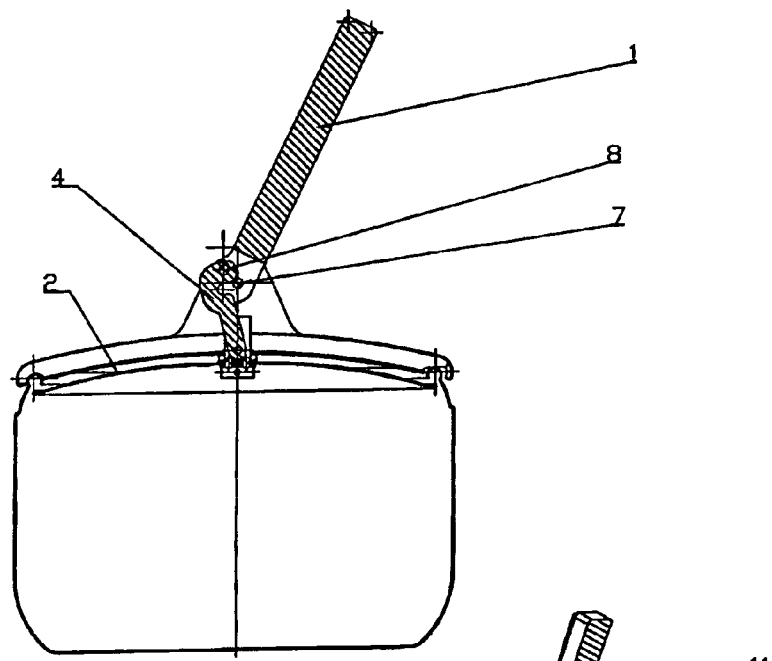
FIGS. 2a, 2b show, in a plane and perspective view respectively, a side sectioned view of the cooker of FIG. 1 during the phase of closure.
Figure 2B:
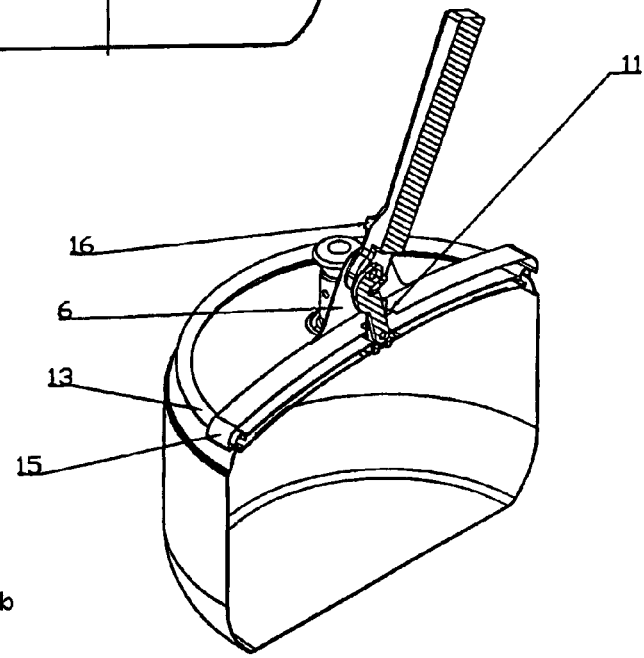

Referring to FIG. 1, the system of opening and closure according to the present invention comprises a lever handle 1, a flexible lid 2, a cross member 3, and a fork 4. The head 5 of the lever handle 1 is rotatably connected to the brackets 6 of the cross member 3 by means of the hinge 7, in such a way that the fulcrum of the lever is placed at a fixed distance from said cross member, and the handle 1, during rotation, never comes into contact therewith. The brackets 6, symmetrically positioned at the sides of the cross member in a central position, are rigidly restrained thereto in a known manner, for example, by welding. The head 5 of the handle 1 is also connected to the fork 4 thanks to the hinge 8, and the fork 4 to the flexible lid 2 by means of the hinge 9. The flexible lid 2 is therefore placed in a position below the cross member 3, and the arms of the fork 4 which connect it to the handle pass through the slots 11 with which said cross member is provided, as can be seen in FIGS. 2b and 3b. These slots 11 are dimensioned in such a way as to allow a translation of the handle and cross member system in relation to the flexible lid 2. The two hinges 7 and 8 are also positioned in such a way that the first hinge is above the second in an open handle position.

Referring to FIG. 1, the flexible lid 2 is inserted in the pressure receptacle 12, and the cross member 3 is positioned in a bridge fashion on the rounded edge 13 of said pressure receptacle, in such a way that the profile of the rounded edge 13 engages the nosepieces 15 of the cross member 3, and the latter maintains its position stably. The cross member 3 has an arc configuration, with the convex surface turned towards the handle 1, and is formed by a U profile which provides it with high resistance to bending. The flexible lid 2 is provided with a thickened edge 14, which engages the internal profile of the rounded edge 13 of the pressure receptacle 12 during the operation of closure of the system. The lever handle 1, which in the open position is arranged horizontally, is rotated through a plane angle around the fulcrum, which coincides with the hinge 7, and then brought into the closure position. Referring to FIGS. 2a and 3a, during rotation of the handle 1 the hinge 8, starting from a position below the hinge 7, rotates integrally with the handle and describes a semicircular trajectory, which takes it into a position above the hinge 7 at the end of said rotation, as can be seen in FIGS. 3a and 3b. Since the hinge 7 is the fulcrum of the rotation, this variation in height of the hinge 8 in relation to the hinge 7 entails the fact that the fork 4, hinged at the ends with the handle 1 and the flexible lid 2, raises the latter until causing it to abut with the edge 13 of the pressure receptacle. The action of raising of the lid is gradual and designed to reduce the forces in the actual final phase of closure, which would otherwise be laborious, while the cross member 3, positioned in a bridge fashion on the edge 13 of the pressure receptacle, works through counter-abutment, supplying the restraining reactions required for reduction in forces. The fork 4 is also configured to have a seat 10, wherein the hinge 8 is engaged in a closure position in such a way that it is positioned above the hinge 7, as can be seen in FIGS. 3a and 3b.

The handle 1 is provided with shoulders 16 suitable for limiting, through contact with the brackets 6, the extent of the rotation to a plane angle, which can be seen in FIGS. 2b and 4, This ensures that, should the handle escape the hand of the user during the operation of opening or closure, it would not dangerously hit the other hand of the user, resting on the cooker, like a whip. The cross member 3 which equips this new system of opening and closure was redimensioned due to the fact that the handle 1 did not press on the back of the cross member to raise the lid. With the redimensioning, the peak load is withstood entirely by the vertical walls of the cross member 3. This observation, which have led to the determination of the yield point and of the ultimate tensile stress of the cross member, has allowed a reduction in the thickness of the cross member, made typically in stainless steel. This material, known for its excellent mechanical properties, is moreover quite costly. A reduction in material which does not entail a weakening in the structure is to be considered a considerable success from the design standpoint, linked to the saving in raw material, although it is also possible to use other suitable, less noble materials.

As can be seen in FIG. 4, the flexible lid 2 will obviously be provided with appropriate seats for holding known safety means of pressure cookers, such as a gravity pressure release valve, a safety valve with fusible pastille, and a safety button which, following the rise in the pressure inside the receptacle, is pushed outwards, blocking the handle in the correct position of closure. The handle 1 will therefore have suitable means, such as shoulders or seats, which allow locking by the safety button which equips the lid 2.

It is understood that shapes, materials and thicknesses are determined by production needs and by decisions of the designer, and may vary in line with fulfillment of the declared functions of the device and the observance of strict safety tests whereto these systems are subjected, without the content of the concepts being claimed herein below being altered in any way.

The pressure cooker, and consequently the closure system, may vary in the dimensions in order to meet every need in terms of capacity, without changing the functional principles claimed.

The invention claimed is:

1. A system of opening and closure with a lever servo-mechanism for a pressure cooker comprising a lever handle (1), a flexible lid (2) and an arc-shaped cross member (3) with a curved surface turned towards the handle, said system comprising a fork (4), with one arm of suitable thickness, and a seat, said fork connected to the lever handle with a first hinge (8) and to the flexible lid with a second hinge (9), and a third hinge (7) for connection between said handle and the cross member (3), in such a way as to reduce the force to be applied to the lever handle (1), characterised in that said cross member (3) is provided with at least one pair of brackets (6), symmetrically positioned along side said cross member (3) in a central position, and rigidly restrained thereto, whereto the lever handle (1) is connected by means of said third hinge (7).

2. A system of opening and closure according to claim 1, characterised in that said cross member (3) is provided with at least one slot (11) for the passage of the fork (4), dimensioned in such a way as to allow a translation of a handle (1) and cross member (3) system in relation to the flexible lid (2).

3. A system of opening and closure according to claim 2, characterised in that the third hinge (7) and the first hinge (8) are positioned in such a way that said third hinge (7) is above said first hinge (8) in an open handle position, and in a closed handle position, said third hinge (7) is below said first hinge (8).

4. A system of opening and closure according to claim 3, characterised in that the fork is formed by at least one arm shaped such as to have a seat (1), wherein the first hinge (8) engages in the closure position.

5. A system of opening and closure according to claim 4, wherein the handle (1) is provided with shoulders (16) suitable for limiting, by means of contact with brackets (6), the extent of rotation to a predetermined angle.

6. A system of opening and closure according to claim 5, wherein the lever handle (1) is rotatably connected to the brackets (6) of the cross member (3) by means of said third hinge (7), and the first hinge (8), starting from a position below the third hinge (7), rotates integrally with the handle (1) and describes a semicircular trajectory, which takes the handle (1) into a position above said third hinge.

7. A system of opening and closure according to claim 6, wherein the flexible lid (2) is provided with known safety means of pressure cookers such as a pressure release valve (18, 19) and a safety button (17).

* * * * *